(12) United States Patent
Trzmiel et al.

(10) Patent No.: US 7,013,877 B2
(45) Date of Patent: Mar. 21, 2006

(54) PRESSURE CONTROL VALVE, ESPECIALLY FOR HIGH PRESSURE DIESEL PUMPS OF INJECTION DEVICES OF MOTOR VEHICLES

(75) Inventors: Alfred Trzmiel, Grafenberg (DE); Rolf Neuhaus, Lohr (DE); Friedrich Zapf, Karlstadt (DE)

(73) Assignee: Hydraulik-Ring GmbH, Nürtingen (DE)

( * ) Notice: Subject to any disclaimer, the term of this patent is extended or adjusted under 35 U.S.C. 154(b) by 0 days.

(21) Appl. No.: 10/249,423

(22) Filed: Apr. 8, 2003

(65) Prior Publication Data

US 2003/0192507 A1    Oct. 16, 2003

(30) Foreign Application Priority Data

Apr. 12, 2002  (DE)  .............................. 102 16 154

(51) Int. Cl.
*F02M 37/04*   (2006.01)

(52) U.S. Cl. ...................... 123/506; 123/514; 251/363

(58) Field of Classification Search ............... 123/506, 123/458, 514, 498, 467; 251/129.06, 363; 417/283, 301

See application file for complete search history.

(56) References Cited

U.S. PATENT DOCUMENTS

| | | | | |
|---|---|---|---|---|
| 4,622,942 A | * | 11/1986 | Nozaki et al. | 123/446 |
| 4,753,212 A | * | 6/1988 | Miyaki et al. | 123/506 |
| 4,762,300 A | * | 8/1988 | Inagaki et al. | 251/129.06 |
| 4,838,233 A | * | 6/1989 | Hayashi et al. | 123/506 |
| 5,150,688 A | * | 9/1992 | Nothdurft et al. | 123/506 |
| 5,224,510 A | | 7/1993 | Pericles | 137/487.5 |
| 5,357,944 A | * | 10/1994 | Rathmayr | 123/509 |
| 6,062,533 A | | 5/2000 | Kappel et al. | 251/57 |
| 6,386,185 B1 | * | 5/2002 | Cooke | 123/506 |
| 6,595,238 B1 | * | 7/2003 | De Matthaeis | 137/539 |
| 2003/0062026 A1 | | 4/2003 | Boecking | 123/446 |

FOREIGN PATENT DOCUMENTS

WO   00/52322   3/2000

\* cited by examiner

*Primary Examiner*—Carl S. Miller
(74) *Attorney, Agent, or Firm*—Gudrun E. Huckett

(57) ABSTRACT

A pressure control valve for a high-pressure diesel pump of an injection device of a motor vehicle has a valve body and a piezo drive with a tappet securing the valve body in a closed position. The valve body in the closed position closes off a bore, containing a medium under pressure, relative to a pressure-relief bore. The piezo drive has at least one piezo element connected to the tappet. The piezo drive is mounted in a pump housing of the high-pressure diesel pump. A screw element receives the piezo drive and is used to screw the piezo drive into the mounting chamber of the pump housing.

7 Claims, 1 Drawing Sheet

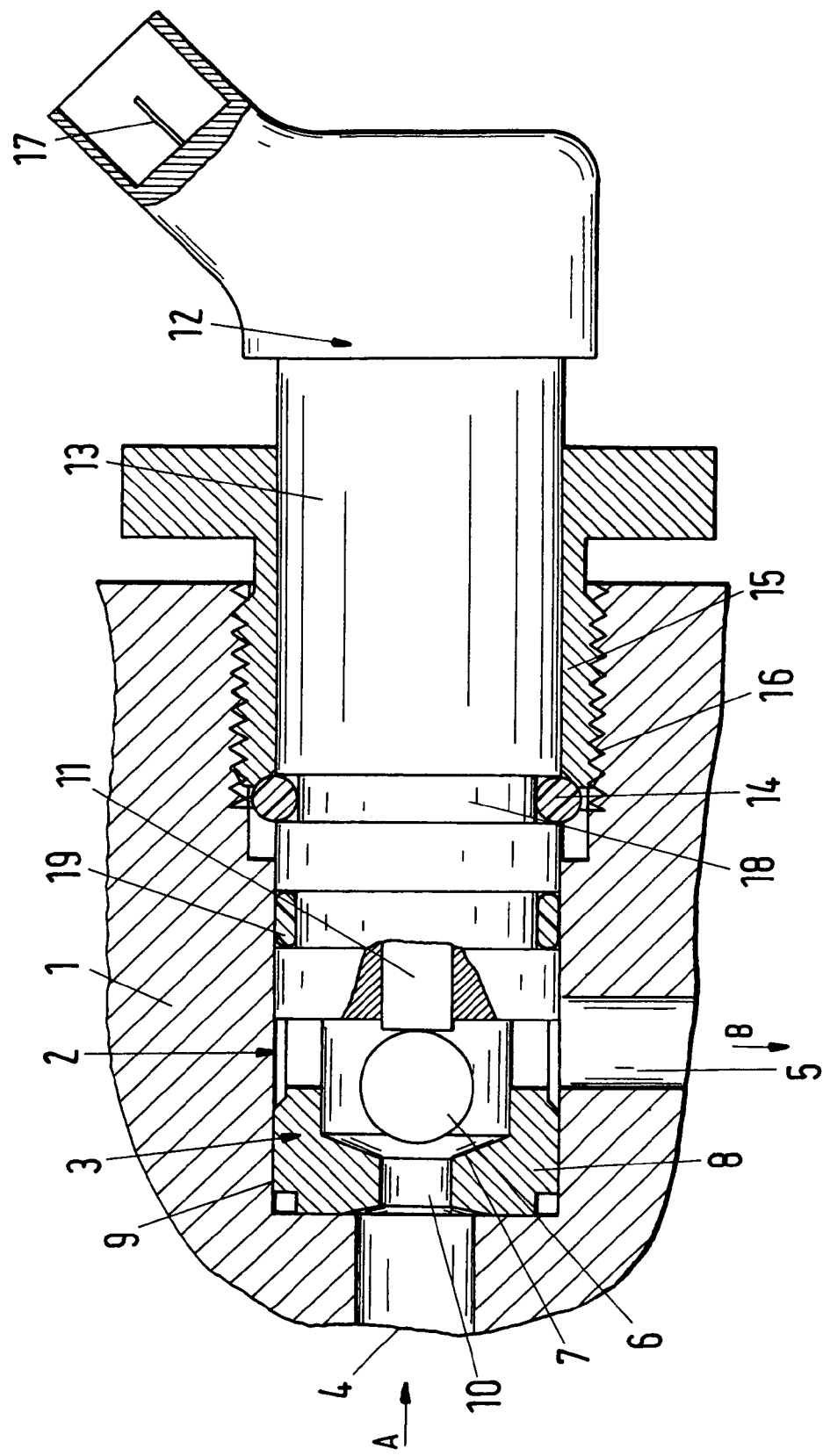

PRESSURE CONTROL VALVE, ESPECIALLY FOR HIGH PRESSURE DIESEL PUMPS OF INJECTION DEVICES OF MOTOR VEHICLES

BACKGROUND OF INVENTION

1. Field of the Invention

The invention relates to a pressure control valve, in particular, for high-pressure diesel pumps of injection devices in motor vehicles, comprising a valve body which is secured by a tappet of a drive in a closed position in which the valve body closes off a bore, containing a medium under pressure, relative to a pressure-relief bore.

2. Description of the Related Art

Pressure control valves have the task to open, when surpassing a predetermined pressure in the pressure line conducting the medium, a passage for a medium into a pressure-relief bore so that the excessive pressure can be relieved. The valve body is secured by the tappet in its mounted position which tappet is actuated by a drive in the form of a solenoid. The solenoid drive is comprised of several components; this increases the cost of the pressure control valve. Moreover, the control of the solenoid is complex.

SUMMARY OF INVENTION

It is an object of the present invention to configure the pressure control valve according to the aforementioned kinds such that it has a simple configuration, can be manufactured inexpensively, and can be controlled in a simple way.

In accordance with the present invention, this is achieved in that the drive is a piezo drive comprising at least one piezo element connected to the tappet.

In the pressure control valve according to the intention, the drive for the tappet is embodied as a piezo drive. It is of a simple configuration, comprised only of a few components, and can thus be manufactured inexpensively. Moreover, the piezo drive can be controlled in a simple way.

BRIEF DESCRIPTION OF DRAWINGS

FIG. 1 shows an embodiment of the pressure control valve according to the intention in axial section.

DETAILED DESCRIPTION

The pressure control valve illustrated in FIG. 1 in axial section is provided preferably for high-pressure diesel pumps. The high-pressure pump has a housing 1 which has a mounting chamber 2 for the pressure control valve 3. A pressure bore 4 as well as a tank bore 5 are connected to the mounting chamber 2. The two bores 4, 5 are separated from one another by a valve body 6 which in the embodiment is a valve ball. It is positioned in the closed position of the valve on a valve seat 7 provided on an insert 8 that rests sealingly against the wall 9 of the mounting chamber 2. A bore 10 opens centrally into the valve seat 7; it has a diameter that is smaller than that of the two bores 4, 5.

The valve body 6 is secured by a tappet 11 in its sealing or closing position. The tappet 11 is actuated by piezo drive 12. The tappet 11 is fixedly connected to the piezo elements. The piezo drive 12 is configured in a way known in the art and comprises a housing 13 which is mounted seal-tightly by means of at least one sealing ring 14 in a nut 15 which can be screwed into a widened section 16 of the mounting chamber 2. The piezo drive 12 is provided at its end projecting from the nut 15 with a current/voltage connector 17. The housing 13 of the piezo drive 12 has an annular groove 18 for receiving the sealing ring 14 and projects into a part of the mounting chamber 2 receiving the insert 8. Within this part of the mounting chamber 2, the housing 13 is sealed by a further sealing ring 19 resting sealingly against the inner wall 9 of this part of the mounting chamber 2.

By supplying current to the piezo drive 12, the tappet 11 is moved into a contact position at the valve body 6 which causes the valve body 6 to rest sealingly against the valve seat 7 and to close the bore 10. The force with which the tappet 11 forces the valve body 6 into its closing position can be adjusted variably by the current/voltage level.

As long as the pressure of the medium present within the pressure bore 4 is less than the pressure which is exerted by the tappet 11 on the valve body 6, the bore 10 remains closed. As soon as the pressure of the medium in the bore 4 surpasses the pressure acting on the valve body 6, the valve body 6 is lifted off the valve seat 7 against the pressure exerted by the piezo drive 12 so that the medium can flow from the bore 4 into the bore 10 and into the tank bore 5. Accordingly, the excess pressure in the pressure bore 4 can be reliably relieved. The medium flows via the tank bore 5, functioning as a pressure-relief bore, to the pressure medium tank. As soon as the pressure of the medium in the bore 4 is smaller than the counter pressure exerted by the tappet 11, the valve body 6 is returned into its closing position on the valve seat 7 in which it closes off the bore 10.

The described proportional pressure control valve is preferably used in a high-pressure diesel pump. Only minimal costs are required for producing such pressure control valves because the piezo drive 12 of the injector valves of the high-pressure pump can be used. By employing the piezo drive 12, the number of components of the pressure control valve is reduced. Since the piezo drive 12 has only a minimal height, the pressure control valve also has a correspondingly minimal height. The piezo elements of the piezo drive 12 have a very short response time so that a high stability of the pressure control valve is provided. Triggering or actuating the piezo drive 12 can be performed in an analog or digital way. As a result of the use of the piezo drive 12, the hysteresis is zero because the tappet 11 is subjected to a force only at one end by means of the piezo elements. A limitation of the supply cross-section of the bore 4 is not required. Since the piezo elements have a very short response time, the pressure control valve exhibits very high dynamics.

As in the shown embodiment, the pressure control valve can be mounted directly in the housing 1 of the pump. Since the piezo drive 12 can be screwed by means of the nut 15 into the pump housing 1, the piezo drive 12, if needed, can be simply exchanged. For controlling the piezo drive 12, the electronic device of the injector control of the high-pressure diesel pump can be used. Moreover, the same voltage as employed for the injector control can be used for the operation of the piezo drive 12. As a result of its compact configuration and its minimal number of components, the pressure control valve has advantageously only a minimal weight. Moreover, the pressure control valve can be checked in the mounted state because a subsequent adjustment of a pole spacing, as in the case of electromagnetically controlled tappets, is not required. As a result of their residual charge, the piezo elements provide also a securing function because the tappet 11 is forced, even without supplying an electrical voltage to the piezo drive 12, against the valve body 6 so that the valve body 6 is secured in the closed position when the piezo drive 12 is not supplied with current. In the conventional proportional pressure control valves, this securing function is realized by a spring bias with which the tappet is forced against the valve body when the solenoid is switched off. In this connection, tolerances in the spring bias cause problems in regard to this securing function. Such problems do not occur for the piezo drive 12 as a result of the residual charge of the piezo elements even when the piezo drive 12 is not supplied with current.

While specific embodiments of the invention have been shown and described in detail to illustrate the inventive principles, it will be understood that the invention may be embodied otherwise without departing from such principles.

What is claimed is:

1. A pressure relief valve for a high-pressure diesel pump of an injection device of a motor vehicle, the pressure relief valve comprising:
   a valve body,
   a valve seat;
   a bore opening into the valve seat and containing a medium under pressure;
   a piezo drive comprising a tappet forcing the valve body sealingly against the valve seat into a closed position in which the valve body, closes off the bore, relative to a pressure-relief bore of a pressure medium tank;
   wherein the valve body lifts off the valve seat to release the bore only when the pressure of the medium in the bore surpasses a counter pressure exerted by the piezo drive onto the valve body for forcing the valve body against the valve seat so that excessive pressure of the medium within the bore relative to the counter pressure is relieved by the medium flowing via the pressure-relief bore to the pressure medium tank;
   wherein the valve body returns into the closed position when the pressure of the medium in the bore drops below the counter pressure exerted by the piezo drive onto the valve body;
   wherein the piezo drive comprises at least one piezo element connected to the tappet.

2. The pressure relief valve according to claim 1, wherein the piezo drive is configured to be mounted in a pump housing of the high-pressure diesel pump.

3. The pressure relief valve according to claim 1, further comprising a screw element, wherein the piezo drive is configured to be screwed with the screw element into a mounting chamber of the pump housing.

4. The pressure relief valve according to claim 3, wherein the screw element is a nut and the piezo drive is inserted into the nut.

5. The pressure relief valve according to claim 2, further comprising an insert configured to be inserted into the mounting chamber of the pump housing, wherein the valve seat interacting with the valve body is provided within the insert.

6. The pressure relief valve according to claim 1, wherein the piezo drive is configured to be controlled by an injector control of the injection device controlling injection valves of the injection device.

7. The pressure relief valve according to claim 1, wherein the valve is a proportional pressure relief valve.

* * * * *